(12) United States Patent
Lejeune et al.

(10) Patent No.: US 9,142,213 B2
(45) Date of Patent: Sep. 22, 2015

(54) GENERATING VOCAL USER INTERFACE CODE FROM A DATA META-MODEL

(75) Inventors: Remi Lejeune, Chatou (FR); Jean-Yves B. Rigolet, Paris (FR)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 13/140,301

(22) PCT Filed: Oct. 20, 2009

(86) PCT No.: PCT/EP2009/063704
§ 371 (c)(1),
(2), (4) Date: Jun. 16, 2011

(87) PCT Pub. No.: WO2010/069635
PCT Pub. Date: Jun. 24, 2010

(65) Prior Publication Data
US 2011/0252398 A1    Oct. 13, 2011

(30) Foreign Application Priority Data
Dec. 19, 2008   (EP) .................................. 08305979

(51) Int. Cl.
*G06F 9/44*    (2006.01)
*G10L 15/22*   (2006.01)
*G06F 3/16*    (2006.01)

(52) U.S. Cl.
CPC . *G10L 15/22* (2013.01); *G06F 8/38* (2013.01); *G06F 3/167* (2013.01); *G06F 9/44* (2013.01)

(58) Field of Classification Search
CPC .......... G06F 8/38; G06F 9/4436; G10L 15/22
USPC ................................... 717/104; 704/E15.001
See application file for complete search history.

(56) References Cited

U.S. PATENT DOCUMENTS

| 6,785,653 | B1 * | 8/2004 | White et al. ................ 704/270.1 |
| 7,519,946 | B2 * | 4/2009 | Celi et al. ....................... 717/109 |
| 7,930,182 | B2 * | 4/2011 | Sinai et al. ..................... 704/270 |
| 7,970,601 | B2   | 6/2011 | Burmester et al. |
| 2005/0149331 | A1 * | 7/2005 | Ehrlich ..................... 704/270.1 |

(Continued)

FOREIGN PATENT DOCUMENTS

EP    1959430 A2 *  8/2008

OTHER PUBLICATIONS

Beat Signer, Moira C. Norrie, Peter Geissbuehler, Daniel Heiniger;"Aural Interfaces to Databases Based on VoiceXML";"2002";"15 pages".*

(Continued)

*Primary Examiner* — Wei Zhen
*Assistant Examiner* — Brahim Bourzik
(74) *Attorney, Agent, or Firm* — Roy W. Truelson

(57) ABSTRACT

A method, computer program and system for generating code of the vocal interface of a software application by reading the persistent data of an application designed by a data meta model using a design language such as UML (Unified Modeling Language) defining a hierarchical organization of classes, their attributes and the relations between classes. Similarly to the wizard for graphical user interface the vocal interface code comprises dialog unit code, which is Forms when VoiceXML language is used, to allow at execution time, entry of data for the application in a guided way.

18 Claims, 7 Drawing Sheets

(56) References Cited

U.S. PATENT DOCUMENTS

| | | | |
|---|---|---|---|
| 2006/0004845 A1* | 1/2006 | Kristiansen et al. | 707/103 R |
| 2006/0106861 A1* | 5/2006 | Torgerson et al. | 707/102 |
| 2006/0198501 A1* | 9/2006 | Marche | 379/88.17 |
| 2007/0156406 A1* | 7/2007 | Barton et al. | 704/257 |
| 2007/0233495 A1* | 10/2007 | Agapi et al. | 704/270 |
| 2007/0288885 A1* | 12/2007 | Brunel et al. | 717/104 |
| 2008/0065388 A1* | 3/2008 | Cross et al. | 704/270 |
| 2009/0265686 A1* | 10/2009 | Lucas et al. | 717/120 |

OTHER PUBLICATIONS

Miguel et al;"VoiceBuilder: A Framework for Automatic Speech Application Development";"4 pages";"Apr. 2004".*

"Sequendo et al";"Speeding Up the Design of Dialogue Applications by Using Database Contents and Structure Information";"2009";"10 pages".*

Object Management Group, "UML Profile and Metamodel for Voice-based Applications", OMG Adopted Specification, Jul. 2007.

* cited by examiner

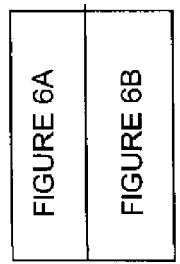

```
<form id="ConsultingProject">
<field name="Name">
    <grammar mode="voice" version="1.0" src="spelling.grxml"/>
    <prompt>
        Please Enter the Name of ConsultingProject, spelling it.
    </prompt>
    <filled>
        <!-- some OCL constraints might be implemented here -->
    </filled>
</field>
<field name="StartingDate">
    <gramar mode="voice" version="1.0" src="date.grxml"/>
    <prompt>
        Please enter the StartingDate of ConsultingProject.
    </prompt>
    <filled>
        <!-- some OCL constraints might be implemented here -->
    </filled>
</field>
```

FIGURE 6A

```xml
<field name="EndingDate">
    <grammar mode="voice" version="1.0" src="date.grxml"/>
    <prompt>
        Please enter the EndingDate of ConsultingProject.
    </prompt>
    <filled>
        <!-- some OCL constraints might be implemented here -->
    </filled>
</field>

<field name="CompanyName">
    <grammar mode="voice" version="1.0" src="spelling.grxml"/>
    <grammar mode="voice" version="1.0" src="skip.grxml"/>
    <prompt>
        Please Enter the CompanyName of ConsultingProject, spelling it.
        If you do not have any, say: skip this <!-- not mandatory field -->
        If you want to exit ConsultingProject form say: finish <!-- not mandatory field -->
    </prompt>
    <filled>
        <!-- some OCL constraints might be implemented here -->
    </filled>
</field>
</form>
```

FIGURE 6B

GENERATING VOCAL USER INTERFACE CODE FROM A DATA META-MODEL

FIELD OF THE INVENTION

The present invention generally relates to software development; more particularly, the invention aims at generating vocal user interface code for a software application using a guided way equivalent to wizards for graphical user interface; also the invention aims at generating the vocal user interface code starting from an entity-relationship model such as a Unified Modeling Language (UML) class diagram describing the software application in a design language.

BACKGROUND OF THE INVENTION

It is a challenge to automate the generation of vocal user interface code while starting from the data model of the entire software application. The current development tools today allow the developers to generate a vocal user interface code by firstly designing a dialog flow from which the vocal user interface code is then automatically generated. As vocal interface ergonomic is usually extremely sensitive, the developers need to modify and customize the vocal user interface code which has been generated in the first step. This development concept has been captured and formalized by OMG in the UML Profile for Voice (OMG).

There is a need that the vocal user interface code of software applications could be automatically generated from a modelization of the data to be captured by the application, for instance a meta data model such as UML class diagrams. However, no such method to automatically generate vocal user interface code directly from a meta data model has been found to date, and even OMG modelization attempt remains highly focused on the interface and dialog flow.

In parallel to the existing software development tools for user interface development, there is a raising number of business applications incorporating highly understandable wizards as graphical user interface. Wizards are interactive software, helping a user using step-by-step pages to achieve complex business operations through a graphical user interface in a guided way. Similarly, a guided way equivalent to wizards for graphical user interface applications is required for vocal user interface applications. It is not possible today to automatically generate directly from a meta data model of a software application, vocal user interface code which allows the user to enter application data in a guided way as done through wizards of a graphical user interfaces.

It is noted that, with the existing prior art, it is not possible today to automatically generate wizard code of a graphical user interface code from a meta data model. For graphical user interfaces there are tools for generating code implementing dialogs of an application starting from a high-level design of the application such as an entity-relationship model. Automatic generation of dialog code has been, and it is still used, by many different software tools, but mostly in development tools like the DynamicTMN® CMIP MIT Browser. It is noted that all of SNMP or CMIP based management systems create the user interface dynamically based on a persistence model. One example is described at the Internet address: http://www.monfox.com/dtmn/java-cmip-mit-browser.html where the user interface is created automatically based on an OO model captured in a CMIP definition. The DynamicTMN® CMIP MIT Browser proposes a treeview of the data model objects in conjunction to a generic property-value table editor in the form of what the Eclipse EMF framework provides. It also proposes more advanced dialogs, still using a entity-relationship model associated with additional graphical inputs, manual ones, like what is defined in the U.S. Pat. No. 5,495,567 describing an automatic interface layout generator for database systems.

There is thus a need to automatically develop vocal user interface code starting from a meta data model of the software application which include vocal user interfaces. Furthermore, in order to help the user to perform operations in a guided way, there is a need for developing vocal interfaces guiding the user for entry of data in a similar way as wizards when they are used in the graphical user interfaces of the software applications.

SUMMARY OF THE INVENTION

Starting from an entity-relationship data model of a software application, some embodiments of the present invention make an interpretation of the model to define the mandatory and optional steps needed to automatically generate guided voice interface code. The guided voice interface of the software application is executed by the application users to create in a guided way dialog entities in the data model of the software application.

As the graphical interface wizards are structured as a succession of pages, similarly, the guided voice interface created by the method and system of the invention is structured as a voice dialog and a succession of dialog units which are called 'forms' in the rest of the document. A 'form' as defined in VoiceXML standard is a dialog code unit corresponding to acquisition of values for a set of fields. Even if similar, pages and forms are not of the same structural nature; standard paging services are associated to a page (move forward, move backward, finish), but this is not the case for the 'forms'. However, in the rest of the document the guided voice interface of the invention will be called 'voice-enabled wizard'.

The technical and ergonomic challenges for automatically generating code for voice-enabled wizards are counterbalanced by the pervasive nature of this vocal interface which can reach out users virtually anywhere through a telephonic line for instance.

One embodiment of the invention is a method executed on a computer for generating a vocal interface code for a software application having the data described with an entity-relationship model comprising classes, class attributes and relations between classes, said method comprising:

for each class read from the entity-relationship model, identified as being neither a class used for an interface of the software application nor an abstract class, creating the structure of a dialog unit code for acquisition of values for the attributes of the class;

for each attribute of the identified class read from the entity-relationship model, if the class has a single relationship to one other class or if the class has a multiple relationship to other classes but the multiple relation does not apply to the attribute, creating in the dialog unit code, code for a direct acquisition of value for the attribute else, creating in the dialog unit code, a sub-dialog code for enabling selection of a dialog unit code of the other classes; and identify if the created form is an entry form or an internal form by reading the relationships associated to the class in the entity-relationship model.

In some embodiments, creating in the dialog unit code, code for a direct acquisition of value for the attribute comprises:

create a prompt code for direct acquisition of value for the attribute;

read the attribute type from the entity-relationship model; if the attribute type is built-in, reference a corresponding existing built-in grammar; and if it is an enumeration, create and reference an enumeration grammar, if it is not an enumeration, if the attribute is defined as contained, creating in the dialog unit code of the class referenced by this attribute, a sub-dialog code for executing the dialog unit code of the class of the attribute, if the attribute is not contained, creating in the dialog unit code of the class referenced by this attribute, a sub-dialog code for selecting the dialog unit code of the class of the attribute.

Some embodiments further comprises the software application user executing a voice-enabled wizard program based on the created voice-enabled wizard code starting by filling attribute values for an entry wizard dialog unit code and the internal wizard dialog unit code if any, until all the wizard dialog unit code attributes have been filled.

In some embodiments, the acts are executed reading a entity-relationship model which is a UML class diagram.

In some embodiments, the code is based on the VoiceXML language for which the dialog unit code is a VoiceXML Form and the code for direct attribute value acquisition in the form is a VoiceXML Field.

In some embodiments, the created code is based on Natural language understanding.

Another embodiment of the present invention is a computer program product comprising programming code instructions for executing a method for generating a vocal interface for a software application having the data described with an entiy-relationship model comprising classes, class attributes and relation between classes when said program is executed on a computer.

Another embodiment of the present invention is a system comprising means adapted for carrying out a method for generating a vocal interface code for a software application having the data described with an entity-relationship model comprising classes, class attributes and relations between classes.

The method of the invention brings the advantages of the design modelization for the developer which allows automatic vocal interface code generation: all the steps of the method can be performed on a computer. The method of the invention provides unified user vocal interface code which are the voice-enabled wizards code of the application. The voice-enabled wizards code as unified will be easily maintained. From the application user perspective the generalization of use of voice-enabled wizards brings the advantage of usability with this guided user interface.

The method proposes a MDA (Model-Driven Architecture) approach for the development of application voice-enabled wizards for instance with UML: this allows to standardize development tools and associated code.

The solution provided starts from a UML class diagram where the persistent data is modelized. This model is then analyzed by the system to automatically produce voice-enabled wizards code.

The method of the invention is a repeatable processes to create voice-enabled wizards of a certain type: this type of wizard is for assisting the application user in creating discrete objects of an entity-relationship model. Compared to an "editor" which only allows providing values to class attributes, the Voice-enabled Wizard Generator creates the voice-enabled wizards which, at execution time, help the user to provide values to the class attributes. The voice-enabled wizards produced by the method of the invention is a fully usable software entity that guides the user of the application containing the voice-enabled wizards to fill its attribute values, being simple type values, from a simple string, a date or a Boolean to a more complex attribute value such as a reference to another object. The voice-enabled wizard's entity instance created and filled by the application user could be reused for an edition, for instance, by other programs of the software application.

BRIEF DESCRIPTION OF THE DRAWINGS

FIG. 6 (FIG. 6A, FIG. 6B) is an example of generated code, generated from part of data meta-model presented on FIG. 1.

DETAILED DESCRIPTION OF THE PREFERRED EMBODIMENT

Figure 1:
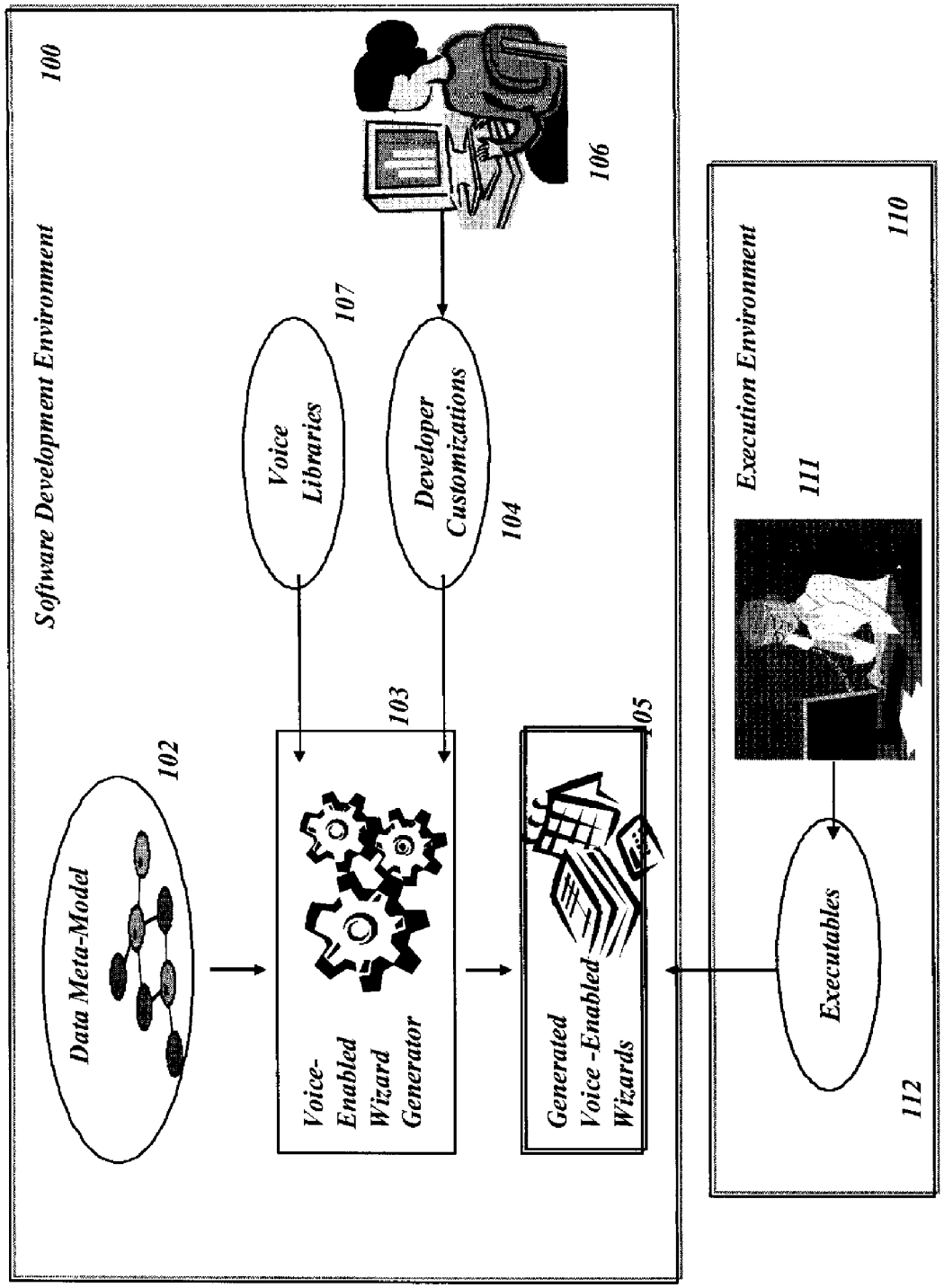
FIG. 1 illustrates the environment for building and using the voice-enabled application wizards produced by the invention according to the method of the preferred embodiment.

FIG. 1 illustrates the environment for building and using the voice-enabled application wizards produced by the method of the preferred embodiment. This environment allows generation of the code of the wizards of the application which manipulate persistent data of the application described in an entity-relationship model (102), the data meta-model of the application that can be a UML class diagram.

In the preferred embodiment, the method to generate voice-enabled wizard code is implemented as a software program, the Voice-enabled Wizard Generator (103) executing on a computer. Other possible implementations of the steps of the method to create voice-enabled wizard source code are also suitable (hardware, language interpreter etc. . . . ).

The Voice-enabled Wizard Generator (103) allows the application developer to generate the code of a fully-usable Voice-enabled Wizard (105). The voice-enabled wizard programs can be then combined with an application executable (112) to provide a user (111) of the application a way to easily create application data and their attributes in a linear vocal interaction.

This target voice-enabled wizard (105) can be either expressed as UML Profile for Voice (OMG) or adequate programming languages, including Voice-XML as a dialog-oriented language and java for dealing with dynamic content and high level dialog flow control.

The Voice-enabled Wizard Generator (103) is running in a 'Software Development Environment' (100) and creates the code of the voice-enabled wizards of an application. The voice-enabled wizards are then deployed and executed in the 'Execution Environment' (110).

The Software Development Environment (100) is a development framework as many exist today which comprises tools such as editors, wizards, compilers, linkers available in the developer computer workspace to build the entire application. The software environment is installed as programs operating on an Operating System providing a graphical user interface used as the favorite developer interface of the preferred embodiment of the invention.

The Execution Environment (110) is hardware and software platform suitable for executing vocal applications, either remotely through telephone channel, or locally if the vocal signal is collected on the same device as where the voice-enabled wizard is executed. The Execution Environment may include an application server, a voice browser, a speech recognition engine and a text-to-speech engine. The Execution environment may optionally also include a multimodal browser to support both vocal and graphical interface.

The core unit, the Voice-enabled Wizard Generator (103) needs a set of information as program input. The first input is a data meta-model (102) of the application created by the application designer representing the data to be manipulated by the application. The data meta-model is described in a design language which can have graphical representation such as UML in the preferred embodiment. A second input is a set of libraries (107) supporting the voice capabilities of run time environment (to generate different languages, different types of voices etc. . . . ).

Amongst other capabilities, the developer (106) can customize parameters used as input by the Voice-enabled Wizard Generator. These parameters may for example define dialog types (directed versus mixed initiative), TTS prompt length, default collection behaviour for free-text attributes (spelling grammar, sound to spelling algorithms . . . ), mandatory fields, order of the form in the voice-enabled wizard . . . . These customizations will be applied when running the voice-enabled wizard in the execution environment.

Figure 2:
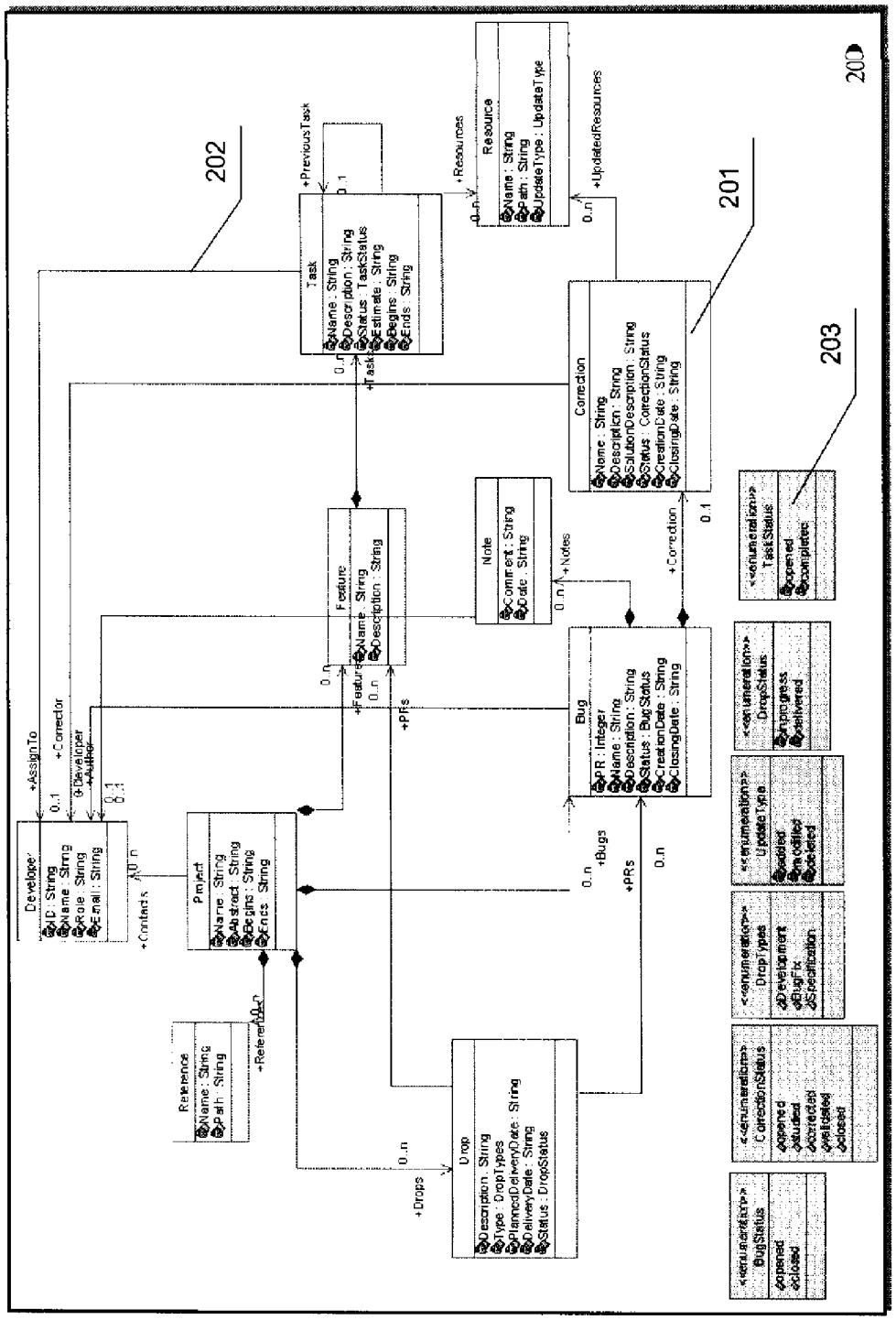
FIG. 2 illustrates an example of a data meta-model represented using the Unified Modeling Language (UML) used as input by the method of the preferred embodiment.

FIG. 2 illustrates an example (200) of a data meta-model which is a UML class diagram used as input by the method of the preferred embodiment.

The data meta-model of FIG. 2 is an entity-relationship model, it has been created by a program designer or architect using any high-level object-oriented modeling language tooling with no vocal interface attributes defined, just classes (201), class attributes, their attribute associated type (203) and the relations between classes (202). This class diagram example has been done using a UML based modeling tool named Rational Rose. Other representations of the data meta-model could have been done using any other high-level object-oriented modeling language tooling.

The entities read from the Data Meta-Model of FIG. 2 which are classes, class attributes and relations between classes, form a navigation tree which is linearized into the flow chart of the voice-enabled wizard program generated by the Voice-enabled Wizard Generator as described in the following figures.

In the example of FIG. 2, the data model is a design for a project management application. The classes which are "contained" are identified as those linked to one other class with a relationship having one black diamond on it. The fact that a class is contained has an impact on the structure of the vocal interface to capture the data for this class. For instance, class Drop is contained in the Project class because there may be a Drop of a project and to capture the data about the Project the user interface must propose also to capture the data about the Drop. On the contrary the relationship between Drop and Bug does not include a black diamond because there is no obligation when capturing data about the Drop to have to capture the data about the Bug. The data about the Bug is mandatorily captured when capturing data about the Project. Similarly, an attribute of a class is identified as contained when the class referenced by this attribute is defined as contained. From a program perspective, the code of a voice enabled wizard program which captures data of a contained class is a subprogram called from elsewhere within this voice enabled wizard program. This concept is further described at step 308 as a sub-dialog.

Figure 3:
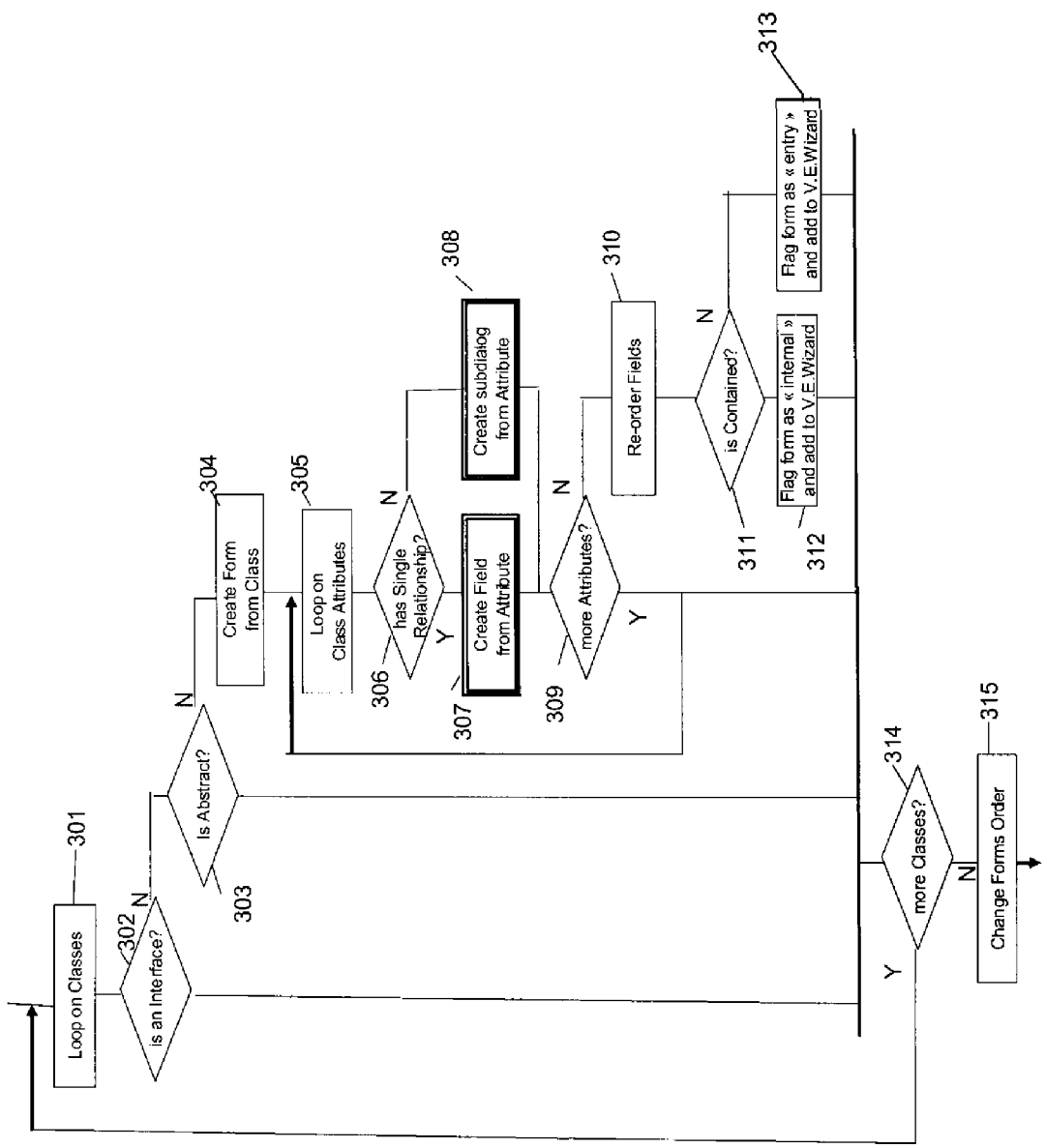
FIG. 3 is the general flowchart of the method of the preferred embodiment.

FIG. 3 is a general flowchart of the method for generating (300) all the voice-enabled wizard components during the generating process. This flow chart is implemented in the generator component.

The first step of the process is to collect all the classes in the data model and loop on all the classes collected (301), then check if dealing with an interface or not (302). A class can implement interfaces which themselves define methods: an interface cannot be instantiated as the concrete classes; consequently, the interfaces must be filtered in the process because they are not edited. When this is an interface class (answer Yes to test 302), the next class is read (314).

When this is not an interface class (answer No to test 302), the system checks if dealing with an abstract class or not (303). An abstract class contains the default behavioural methods and attributes that concrete classes will need to use or redefine; consequently, the abstract classes must be also filtered in the process and only use through the concrete classes that use them later in the process.

When this is an abstract class (answer Yes to test 303), the next class is read (314). When this is not an abstract class (answer No to test 303), the system goes on by executing another main step to generate a form of the wizard (304) from the class definition using the class name as the basis for the form identifier.

The next step of the process is to collect all the attributes of the current class and its ancestors and loops on all the attributes (305). For each attribute, test 306 checks whether it is a single relationship or not.

When this class has a single relationship to another class (answer Yes to test 306), the next step creates a field from the attribute being read (307) in current form. A field, as defined by W3C for Voice XML language is a sub-element of a form used to instantiate a specific variable or attribute based on a grammar. The sub-process definition of field creation is described later in the document in reference with FIG. 4.

Otherwise, when this class has a multiple relationship (answer No to test 306), the next step creates a sub-dialog from the target class of the multiple relationship (308). This sub-dialog aims at defining which entities are part of this attribute and creating these entities if the target class is contained by current class. Once the sub-dialog completes its duty, the execution of the calling form continues from where it was. The behaviour of sub-dialog as defined here is relatively similar to the behaviour of element sub-dialog defined by W3C in Voice XML Language specification; in this specific context, its implementation may also take root in an intermediate programming layer such as java/jsp in order to control dynamic content.

Figure 5:
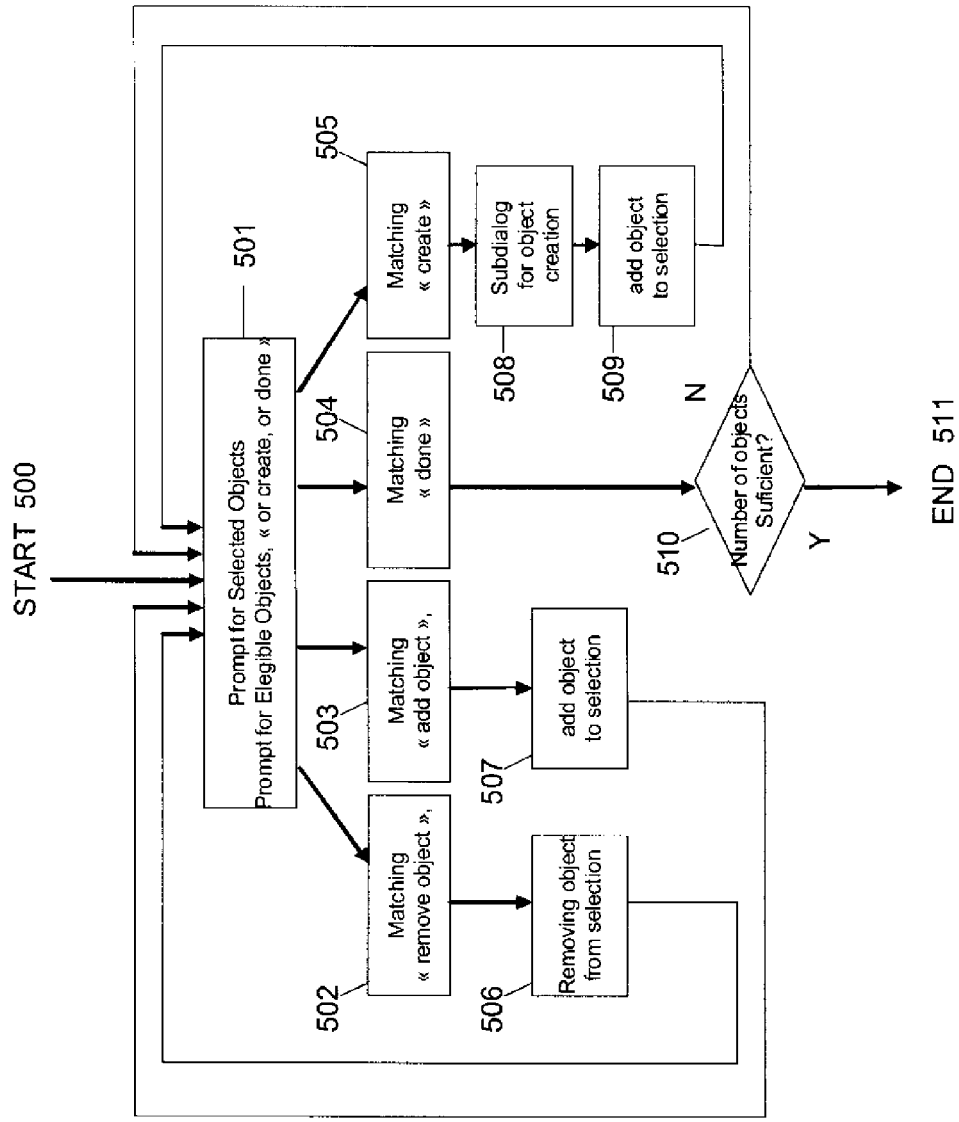
FIG. 5 illustrates an example dialog flow chart, produced by a possible implementation of create sub-dialog from attribute sub-process (308) of the preferred embodiment.

An example of implementation of such a sub-dialog is described at FIG. 5. Alternatively, if target class is not contained by current class, a selection field can be used. Such a field is associated with a grammar allowing certain forms of concatenation of all eligible entities for this attribute.

The next attribute is then read (309) until there is no more attribute in the class (answer No to test 309).

Once all attributes of the class are covered (answer No to test 309), step 310 undertakes the reordering of all fields within the form in order to move forward fields associated with mandatory attributes. This is especially important in a directed (sequential) dialog scheme, which is the preferred embodiment of this invention. Along with the bypass grammar described in step 402 it opens the possibility for the users to skip to next class once all mandatory attributes have been instantiated.

The system then checks if the target class of the relationship is contained (311). This information has been either stored during execution of step 307 (as described later in the document in relation to the description of step 409 of FIG. 4) or is retrieved in this test 311. When the class is not contained but only referenced by the source class of the relationship (answer No to test 311), the next step flags current form as an "entry form" (313). An entry form is an eligible entry point for the dialog flow.

Otherwise, when the class is contained (answer Yes to test 311), the next step flags current form as "internal" (312). An internal form is a form that can only be called from within the voice-enabled wizard based on the source of the relationship. It can not be the entry point of the dialog flow.

The last step of the process (313) adds the created form (304) to voice-enabled wizard as an entry form (313) or as an internal form (312). The dialog flow will unfold in sequential order of form creation except if, optionally, the developer has entered a customization (106) and imposes a specific order. Within each form, the default implementation is a directed (sequential) dialog, although other more elaborated dialog strategies such as mixed initiative or natural language may be considered.

When all the classes are read (answer No to test 314), and all the forms have been created, optional step 315 allows re-ordering of forms if the developer introduced a customization of the page order for a voice-enabled wizard.

Figure 4:
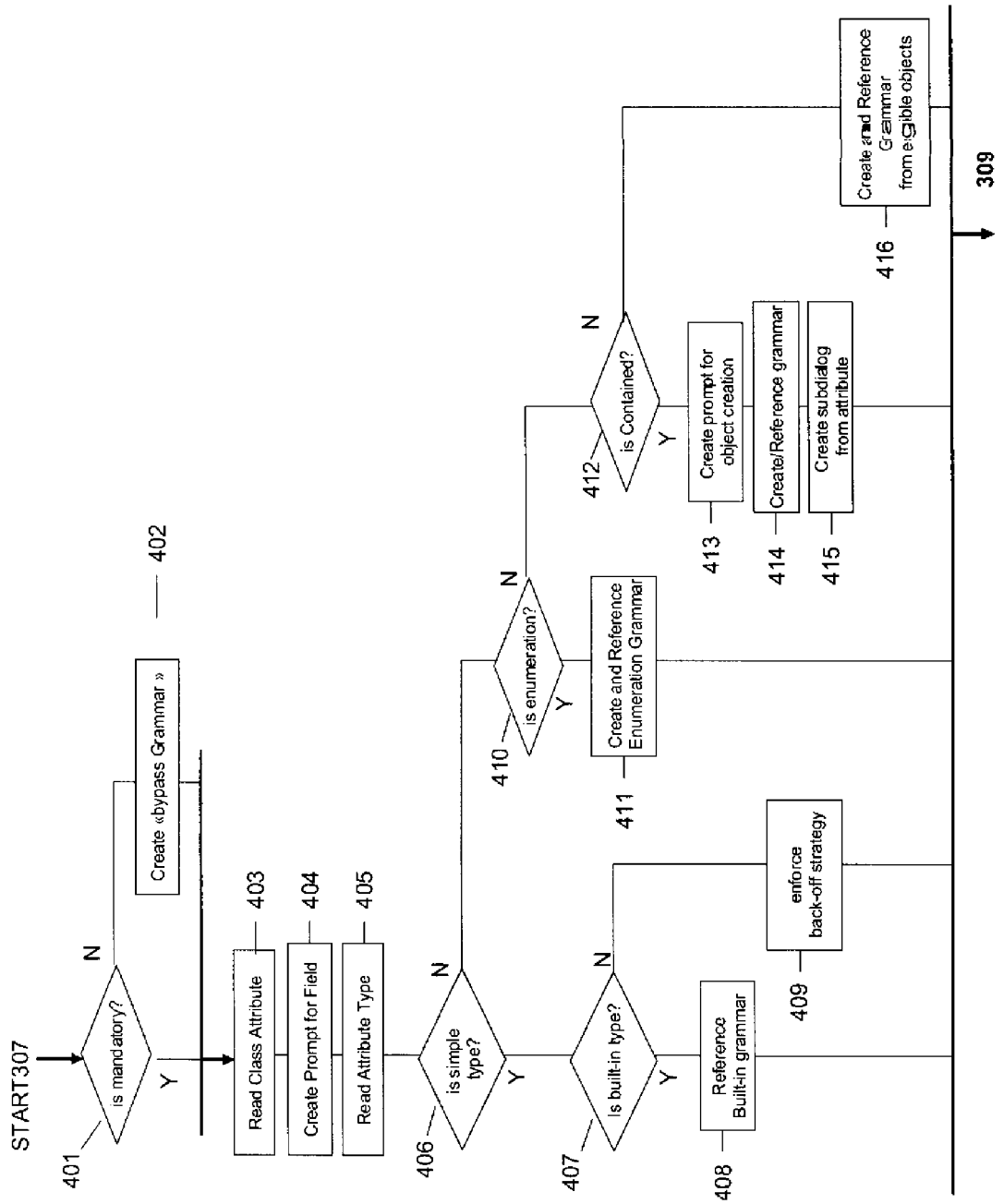
FIG. 4 is the field construction sub-process (307) of the method of the preferred embodiment.

FIG. 4 is the sub-process flowchart (400) for generating a field based on the current class attribute. This flow chart is implemented in the generator component (105). It will feed the current form (304) with a new field.

The first step of the process (401) checks whether the attribute is mandatory. If answer is No, step 402 creates a bypass grammar, which match allows skipping either current or all subsequent attributes. The latter option is made possible in a directed or sequential dialog scheme by step 310, and is equivalent to moving to the next form/class (next or finish button in a graphical interface). This grammar is later included in main field grammars when created (408, 409, 411, 413). Persistent list of mandatory fields for each form can be maintained in order to ease step 310 implementation. When skipping to next form is requested by user at runtime, and if no other form with at least one mandatory item remains to be filled, dialog can end at this point. Steps 401, 402, 408, 409, 411, 413 and 416 form a simple implementation scheme for skipping non optional fields. But other options are possible in other scheme where dialog allows filling fields through a non directed dialog, for instance known in the art mixed-initiative or natural language dialogs.

The class attribute is read in step 403, and its name is used to create a prompt in step 404. This prompt typically uses class attribute name embedded in a default explanatory sentence such as "Please enter value for field X" generated dynamically using Text To Speech technology.

The class attribute type is read in step 405 and checked by the system (406) to separate simple types from complex ones.

When the current type is simple (answer Yes to test 406), the next step is to create a simple entry field (405) based on the corresponding simple type according to the technology. To achieve this goal, step 407 tests whether we are dealing with a built-in type or not. We define built-in type as a type for which our execution environment can provide a grammar, such as voice-xml built-in grammars as defined by W3C. If current attribute type is a built-in type (answer Yes to test 407), step 408 references this built-in grammar for current field.

If current attribute type is not a built-in type (answer No to test 407), step 409 enforces a back-off strategy to collect data for this attribute. This back-off strategy may consist of a back-off grammar covering nearly any text entries (for instance a spelling grammar). Alternatively, a sound-to-spelling system may be used, or as a most basic alternative a mere recording of the audio signal may be collected and stored for this attribute.

The newly created field is then added to the current form (304).

When the attribute type is complex (answer No to test 404), the next step is to check if the type is an enumeration (406) defined in the data model.

When the attribute type is complex (answer No to the test 406), the next step is to check if the type is an enumeration (410) defined in the data model.

When the current type is an enumeration (answer Yes to the test 410), the next step is to create a default enumeration grammar (411) including all the possible values defined in the enumeration. The completed field is then added to the current form (304).

Otherwise, when the current type is not an enumeration (answer No to the test 410), the next step is to check if the system checks if the attribute is contained (412).

When the current attribute is contained (answer Yes to test 412), this means that
  the class referenced by this attribute is defined as contained, and in the entity-relationship data meta-model another class points to this class. A form flagged as internal will be generated for this class.
  the attribute which is analyzed is the one which points to the other class in the data meta-model.

In this case, step 413 creates a TTS prompt that will inform user that an object of the target class is going to be created. A grammar is then created and referenced at step 414 and will allow the user bypass a non mandatory field or jump to next class (see step 402). Step 415 creates a sub-dialog from current attribute in order to instantiate it using the appropriate internal form created for the target class. The newly created field is then added to the current form (304).

Otherwise, when the current attribute is not contained (answer No to test 412), the next step is to create and reference a grammar that will be fed at runtime with eligible existing objects of target class, allowing the user to choose amongst those the appropriate value for current attribute. The newly created field is then added to the current form (304).

FIG. 5 illustrates an example of a dialog flow chart implementing step 308 (create a sub-dialog from multiple relationship attribute). A prompt (501) lists selected objects and eligible objects which will be retrieved dynamically at runtime. The user can also choose to exit current dialog (return to parent form), or create a new object of the target class. Depending on speech recognition match (502, 503, 504, 505), an object is removed from current selection (506), or an object is added to current selection (507), or an object is created and added to current selection (508, 509), or the user can exit the dialog (511) if the number of objects already selected complies with the Data Meta Model.

FIG. 6 (FIG. 6A, FIG. 6B) illustrates an example of dialog code in Voice-XML as it can be generated by the Voice-enabled Wizard Generator (103). Form id "consulting-Project" is created by step 304 for corresponding class. It further contains 4 fields. (Name, StartingDate EndingDate, CompanyName) created by step 307 for corresponding single relationship attributes of class ConsultingProject in entity-relationship data metamodel. Grammars within each of these fields are created and referenced by step 408 for spelling-.grxml and date.grxml, or by step 402 for skip.grxml.

The method for generating voice-enabled wizard code as described with the flowcharts of FIGS. 3, 4 and 5 comprises steps of operations and tests. Although all the steps described in the preferred embodiment can be executed on a computer by an application developer in an interactive mode (106) all these steps can also be automatically executed by a source code generator program as well known in the art. In the preferred embodiment, the invocation of the source code generator can be done by the developer through a wizard of the development framework that will present pages for the developer who optionally may add through a wizard (106) to the generation process. But, the voice-enabled wizard code generation can also be executed in standalone mode and for the optional steps of customization; a customization file may have been prepared in advance by the developer and used as input during the automated execution of the voice-enabled wizard source code generator.

The invention claimed is:

1. A method executed on a computer for generating a vocal interface code for a software application, said method comprising:
   receiving in a computer system an entity-relationship data model of said software application, said entity-relationship data model describing data of said software application and including classes, class attributes, and relations between classes; and
   analyzing the entity-relationship data model to automatically produce code of a voice-enabled wizard for acquiring by user interaction one or more values of respective class attributes of classes described in said entity-relationship data model, said code of the voice-enabled wizard being expressed in a dialog-oriented language, said code of the voice-enabled wizard being produced by:
      collect all the classes in the data model and loop on all the classes collected; and
      for each class read from the entity-relationship model, identified as being neither a class used for an interface of the software application nor an abstract class, creating, from the class descriptions of the entity-relationship model, a structure of a dialog unit code as a respective form in said dialog-oriented language for acquisition of values for the corresponding attributes of the respective class;
      collect all the attributes of the current class and its ancestors and loops on all the attributes; and
      for each attribute of an identified class read from the entity-relationship model, if the identified class has a single relationship to one other class or if the identified class has a multiple relationship to other classes but the multiple relation does not apply to the respective attribute, creating in the dialog unit code corresponding to the identified class, code in said dialog-oriented language for a direct acquisition of value for the respective attribute else, creating in the dialog unit code, a sub-dialog code in said dialog-oriented language for enabling selection of a dialog unit code of the other classes; and
      for each form created in said dialog-oriented language, identifying whether the created form is an entry form or an internal form by reading the relationships associated to the corresponding class in the entity-relationship model, and adding the created form to the voice-enabled wizard as an entry form or as an internal form according to the identification;
   wherein creating in the dialog unit code, code for a direct acquisition of value for the attribute comprises:
      create a prompt code for direct acquisition fo value for the attribute;
      read the attribute type form the entity-relationship model.

2. The method of claim 1 wherein creating in the dialog unit code, code for a direct acquisition of value for the attribute comprises:
   if the attribute type is built-in, reference a corresponding existing built-in grammar; and
   if the attribute is not a simple type, if it is an enumeration, create and reference an enumeration grammar, if it is not an enumeration, if the attribute is defined as contained, creating in the dialog unit code of the class referenced by this attribute, a sub-dialog code for executing the dialog unit code of the class of the attribute, if the attribute is not contained, creating in the dialog unit code of the class referenced by this attribute, a sub-dialog code for selecting the dialog unit code of the class of the attribute.

3. The method of claim 1, further comprising the software application user executing a voice-enabled wizard program based on the created voice-enabled wizard code starting by filling attribute values for an entry wizard dialog unit code and the internal wizard dialog unit code if any, until all the wizard dialog unit code attributes have been filled.

4. The method of claim 1, wherein the acts are executed reading an entity-relationship model which is a UML class diagram.

5. The method of claim 1, wherein the dialog-oriented language is VoiceXML language for which the dialog unit code is a VoiceXML Form and the code for direct attribute value acquisition in the form is a VoiceXML Field.

6. The method of claim 1, wherein the created code is based on a Natural language understanding.

7. A computer program product comprising:
   a plurality of computer-executable instructions recorded on a non-transitory computer-readable media, wherein said computer-executable instructions, when executed by at least one computer system, cause the at least one computer system to:
   receive in the at least one computer system an entity-relationship data model of said software application, said entity-relationship data model describing data of said software application and including classes, class attributes, and relations between classes; and
   analyze the entity-relationship data model to automatically produce code of a voice-enabled wizard for acquiring by user interaction one or more values of respective class attributes of classes described in said entity-relationship data model, said code of the voice-enabled wizard being expressed in a dialog-oriented language, said code of the voice-enabled wizard being produced by:
      collect all the classes in the data model and loop on all the classes collected; and
      for each class read from the entity-relationship model, identified as being neither a class used for an interface of the software application nor an abstract class, creating, from the class descriptions of the entity-relationship model, a structure of a dialog unit code as a respective form in said dialog-oriented language for acquisition of values for the corresponding attributes of the respective class;
      collect all the attributes of the current class and its ancestors and loops on all the attributes; and for each attribute of an identified class read from the entity-relationship model, if the identified class has a single relationship to one other class or if the identified class has a multiple relationship to other classes but the multiple relation does not apply to the respective attribute, creating in the dialog unit code corresponding to the identified class, code in said dialog-oriented language for a direct acquisition of value for the respective attribute else, creating in the dialog unit code, a sub-dialog code in said dialog-oriented language for enabling selection of a dialog unit code of the other classes; and for each form created in said dialog-oriented language, identifying whether the created form is an entry form or an internal form by reading the relationships associated to the corresponding class in the entity-relationship model, and adding the created form to the voice-enabled wizard as an entry form or as an internal form according to the identification;

wherein creating in the dialog unit code, code for a direct acquisition of value for the attribute comprises:
create a prompt code for direct acquisition fo value for the attribute;
read the attribute type form the entity-relationship model.

8. A system, comprising:
a processor; and
a system memory coupled to the processor, the memory containing instructions that cause the system to:
receive in the system an entity-relationship data model of said software application, said entity-relationship data model describing data of said software application and including classes, class attributes, and relations between classes; and
analyze the entity-relationship data model to automatically produce code of a voice-enabled wizard for acquiring by user interaction one or more values of respective class attributes of classes described in said entity-relationship data model, said code of the voice-enabled wizard being expressed in a dialog-oriented language, said code of the voice-enabled wizard being produced by:
collect all the classes in the data model and loop on all the classes collected; and
for each class read from the entity-relationship model, identified as being neither a class used for an interface of the software application nor an abstract class, creating, from the class descriptions of the entity-relationship model, a structure of a dialog unit code as a respective form in said dialog-oriented language for acquisition of values for the corresponding attributes of the respective class;
collect all the attributes of the current class and its ancestors and loops on all the attributes; and
for each attribute of an identified class read from the entity-relationship model, if the identified class has a single relationship to one other class or if the identified class has a multiple relationship to other classes but the multiple relation does not apply to the respective attribute, creating in the dialog unit code corresponding to the identified class, code in said dialog-oriented language for a direct acquisition of value for the respective attribute else, creating in the dialog unit code, a sub-dialog code in said dialog-oriented language for enabling selection of a dialog unit code of the other classes; and
for each form created in said dialog-oriented language, identifying whether the created form is an entry form or an internal form by reading the relationships associated to the corresponding class in the entity-relationship model, and adding the created form to the voice-enabled wizard as an entry form or as an internal form according to the identification;

wherein creating in the dialog unit code, code for a direct acquisition of value for the attribute comprises:
create a prompt code for direct acquisition fo value for the attribute;
read the attribute type form the entity-relationship model.

9. The computer program product of claim 7, wherein creating in the dialog unit code, code for a direct acquisition of value for the attribute comprises:
if the attribute type is built-in, reference a corresponding existing built-in grammar; and
if the attribute is not a simple type, if it is an enumeration, create and reference an enumeration grammar, if it is not an enumeration, if the attribute is defined as contained, creating in the dialog unit code of the class referenced by this attribute, a sub-dialog code for executing the dialog unit code of the class of the attribute, if the attribute is not contained, creating in the dialog unit code of the class referenced by this attribute, a sub-dialog code for selecting the dialog unit code of the class of the attribute.

10. The computer program product of claim 7, further comprising the software application user executing a voice-enabled wizard program based on the created voice-enabled wizard code starting by filling attribute values for an entry wizard dialog unit code and the internal wizard dialog unit code if any, until all the wizard dialog unit code attributes have been filled.

11. The computer program product of claim 7, wherein the acts are executed reading an entity-relationship model which is a UML class diagram.

12. The computer program product of claim 7, wherein the dialog-oriented language is VoiceXML language for which the dialog unit code is a VoiceXML Form and the code for direct attribute value acquisition in the form is a VoiceXML Field.

13. The computer program product of claim 7, wherein the created code is based on a Natural language understanding.

14. The system of claim 8, wherein creating in the dialog unit code, code for a direct acquisition of value for the attribute comprises:
if the attribute type is built-in, reference a corresponding existing built-in grammar; and
if the attribute is not a simple type, if it is an enumeration, create and reference an enumeration grammar, if it is not an enumeration, if the attribute is defined as contained, creating in the dialog unit code of the class referenced by this attribute, a sub-dialog code for executing the dialog unit code of the class of the attribute, if the attribute is not contained, creating in the dialog unit code of the class referenced by this attribute, a sub-dialog code for selecting the dialog unit code of the class of the attribute.

15. The system of claim 8, further comprising the software application user executing a voice-enabled wizard program based on the created voice-enabled wizard code starting by filling attribute values for an entry wizard dialog unit code and the internal wizard dialog unit code if any, until all the wizard dialog unit code attributes have been filled.

16. The system of claim 8, wherein the acts are executed reading an entity-relationship model which is a UML class diagram.

17. The system of claim 8, wherein the dialog-oriented language is VoiceXML language for which the dialog unit code is a VoiceXML Form and the code for direct attribute value acquisition in the form is a VoiceXML Field.

18. The system of claim 8, wherein the created code is based on a Natural language understanding.

* * * * *